(12) United States Patent
Haltom et al.

(10) Patent No.: US 10,951,770 B2
(45) Date of Patent: Mar. 16, 2021

(54) SYSTEMS AND METHODS FOR UTILIZING MACHINE LEARNING TO DETECT AND DETERMINE WHETHER CALL FORWARDING IS AUTHORIZED

(71) Applicant: Verizon Patent and Licensing Inc., Arlington, VA (US)

(72) Inventors: Jeffrey Haltom, Fishers, IN (US); Lulia Ann Barakat, McKinney, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 9 days.

(21) Appl. No.: 16/385,806

(22) Filed: Apr. 16, 2019

(65) Prior Publication Data
US 2020/0336597 A1 Oct. 22, 2020

(51) Int. Cl.
*H04M 3/42* (2006.01)
*H04M 3/54* (2006.01)
*G06N 20/00* (2019.01)

(52) U.S. Cl.
CPC .......... *H04M 3/541* (2013.01); *G06N 20/00* (2019.01); *H04M 3/42059* (2013.01); *H04M 3/548* (2013.01)

(58) Field of Classification Search
CPC .............................. H04M 3/541; G06N 20/00
USPC ........................................ 379/211.02, 212.01
See application file for complete search history.

(56) References Cited

U.S. PATENT DOCUMENTS

| | | | | | |
|---|---|---|---|---|---|
| 5,905,789 | A | * | 5/1999 | Will | H04M 1/271 379/211.03 |
| 6,163,604 | A | * | 12/2000 | Baulier | H04M 3/36 379/189 |
| 8,355,492 | B1 | * | 1/2013 | Polozola | H04M 3/42068 379/114.15 |
| 2015/0146554 | A1 | * | 5/2015 | Bali | H04L 41/5016 370/252 |
| 2015/0334231 | A1 | * | 11/2015 | Rybak | H04M 3/42068 455/414.1 |
| 2017/0149984 | A1 | * | 5/2017 | Flaks | H04M 15/58 |
| 2018/0020093 | A1 | * | 1/2018 | Bentitou | G10L 13/00 |
| 2020/0026828 | A1 | * | 1/2020 | Osborne | G06N 20/00 |
| 2020/0092724 | A1 | * | 3/2020 | Stubblefield | H04W 4/14 |

* cited by examiner

*Primary Examiner* — William J Deane, Jr.

(57) ABSTRACT

A device receives, from a server device, a request to determine whether a call is authorized to be forwarded, where the call is intended to be established between the server device and a first client device via a network, and the call is forwarded from the first client device to a second client device. The device receives, from the network, network data associated with the call and account data associated with a first user of the first client device. The device determines that the call is forwarded based on the network data, and processes the account data and information indicating that the call is forwarded, with a machine learning model, to determine a score indicating whether the call is authorized to be forwarded. The device provides the score to the server device to cause the server device to perform one or more actions.

20 Claims, 10 Drawing Sheets

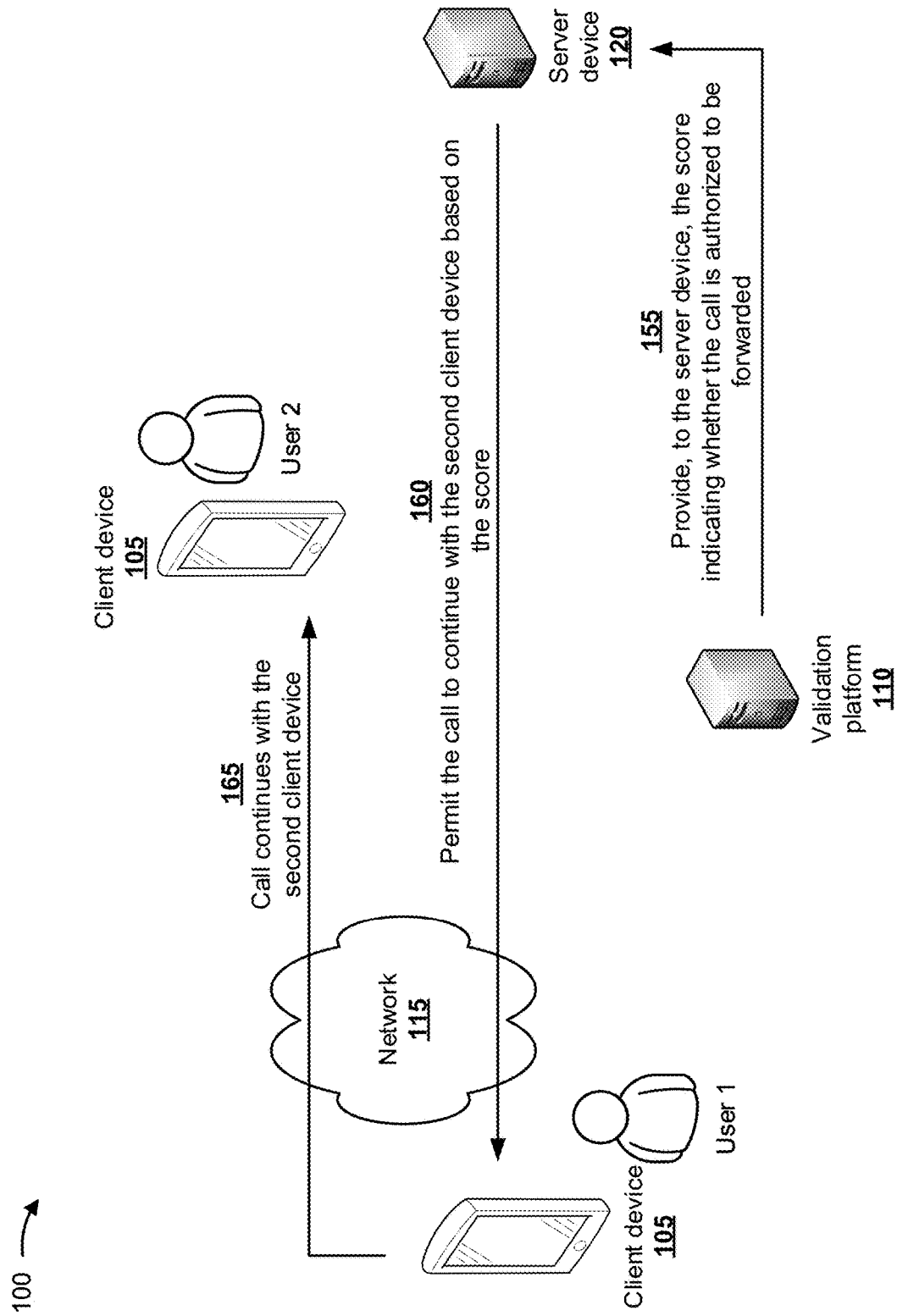

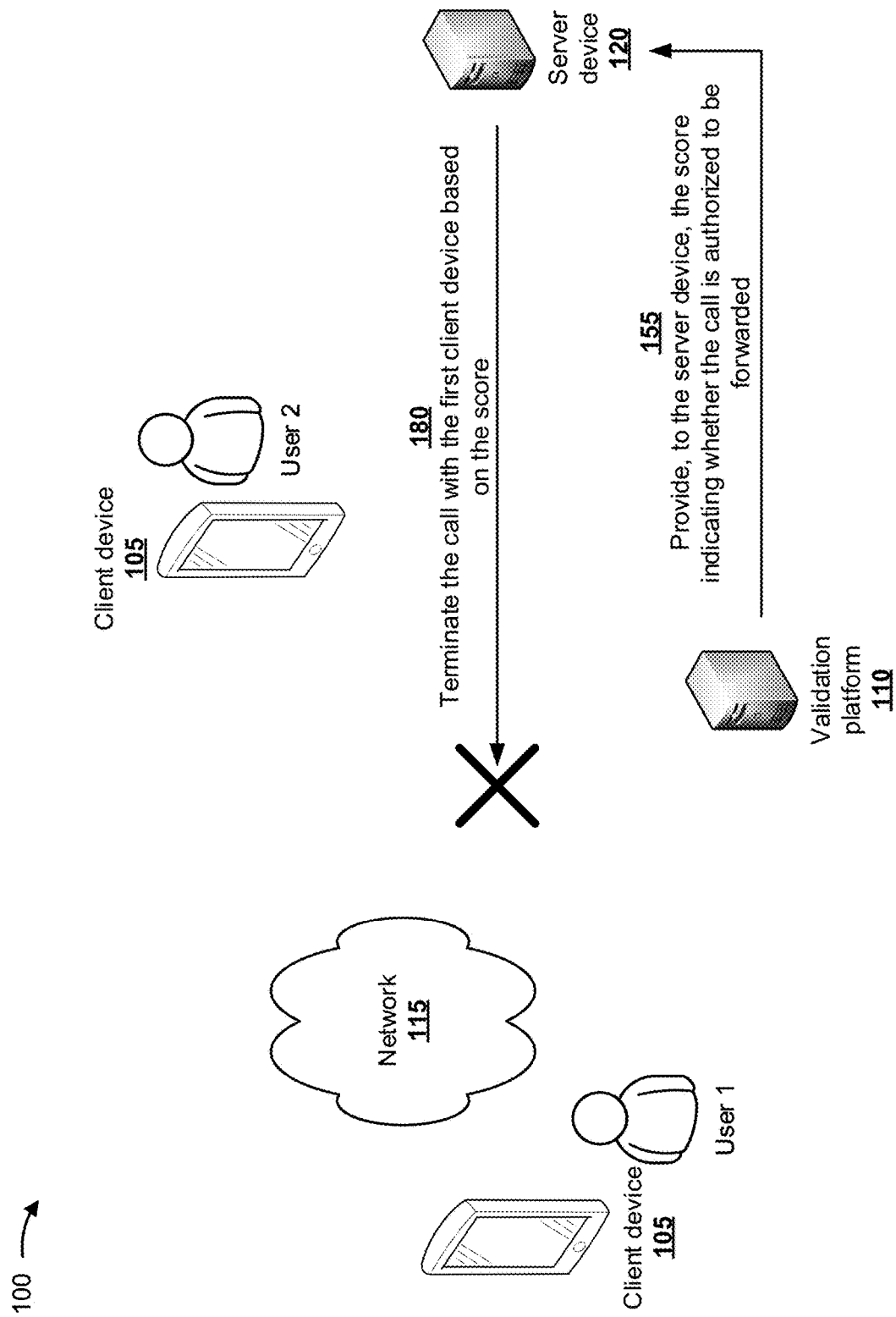

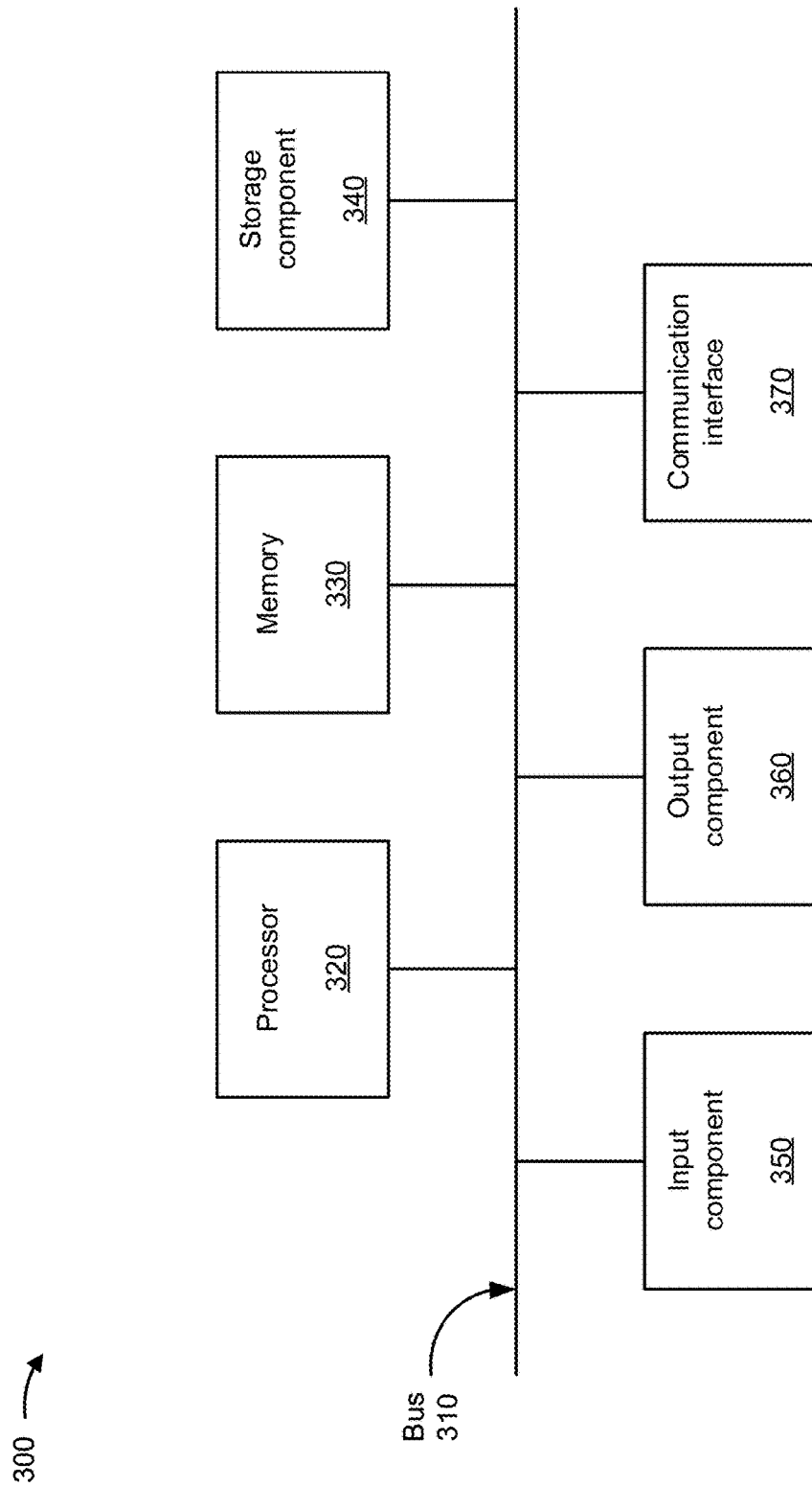

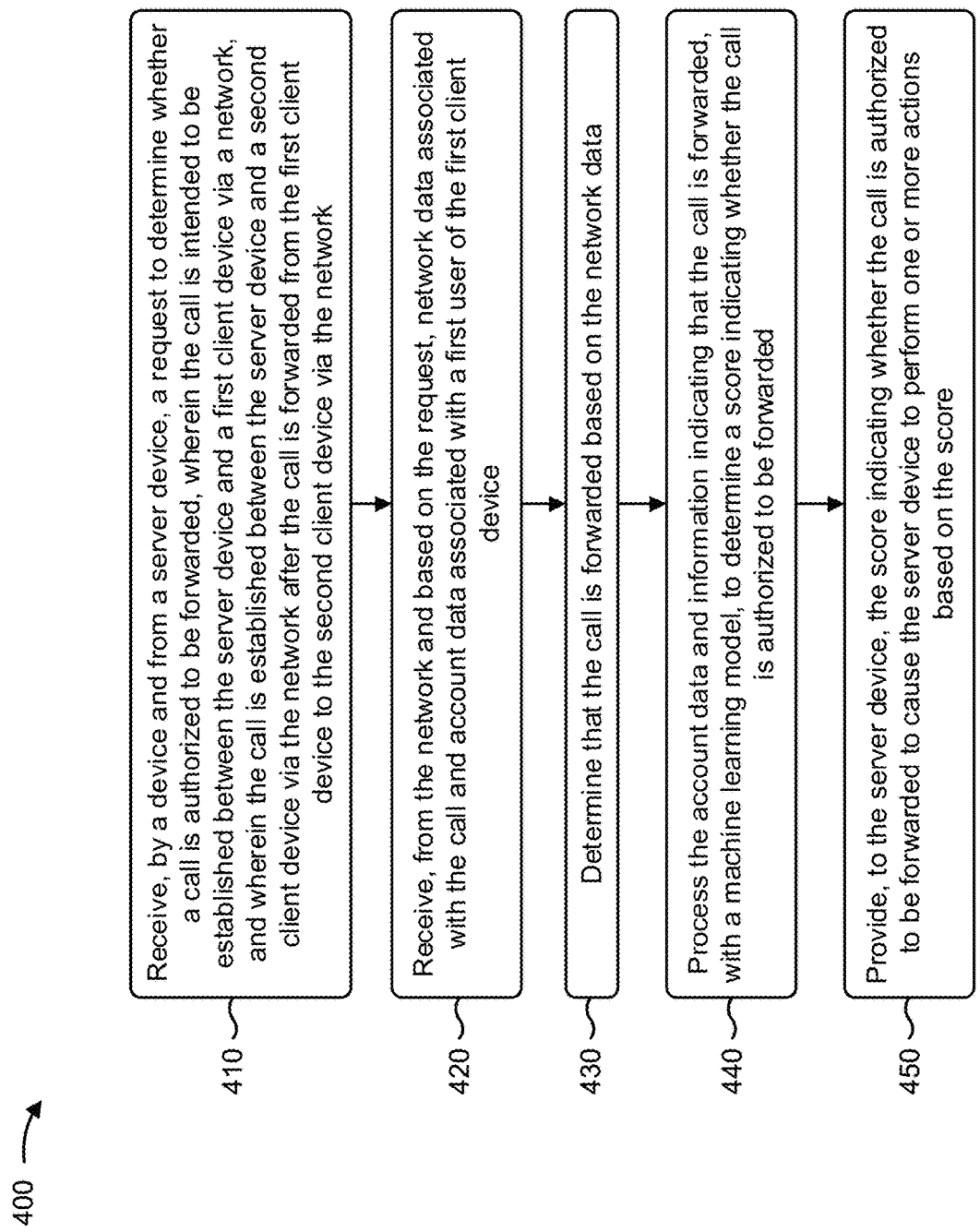

SYSTEMS AND METHODS FOR UTILIZING MACHINE LEARNING TO DETECT AND DETERMINE WHETHER CALL FORWARDING IS AUTHORIZED

BACKGROUND

Call forwarding is a telephony feature of some telecommunications systems that redirects a telephone call received by a called party to another destination (e.g., a mobile device telephone number, a telephone number where the called party is available, and/or the like). Call forwarding or diversion may be based on a busy signal, conditional, unconditional, user enacted and/or selected, predictive, responsive, and/or the like.

BRIEF DESCRIPTION OF THE DRAWINGS

FIGS. 1A-1G are diagrams of one or more example implementations described herein.

FIG. 3 is a diagram of example components of one or more devices of FIG. 2.

FIG. 4 is a flow chart of an example process for utilizing machine learning to detect and determine whether call forwarding is authorized.

DETAILED DESCRIPTION OF PREFERRED EMBODIMENTS

Figure 1A:
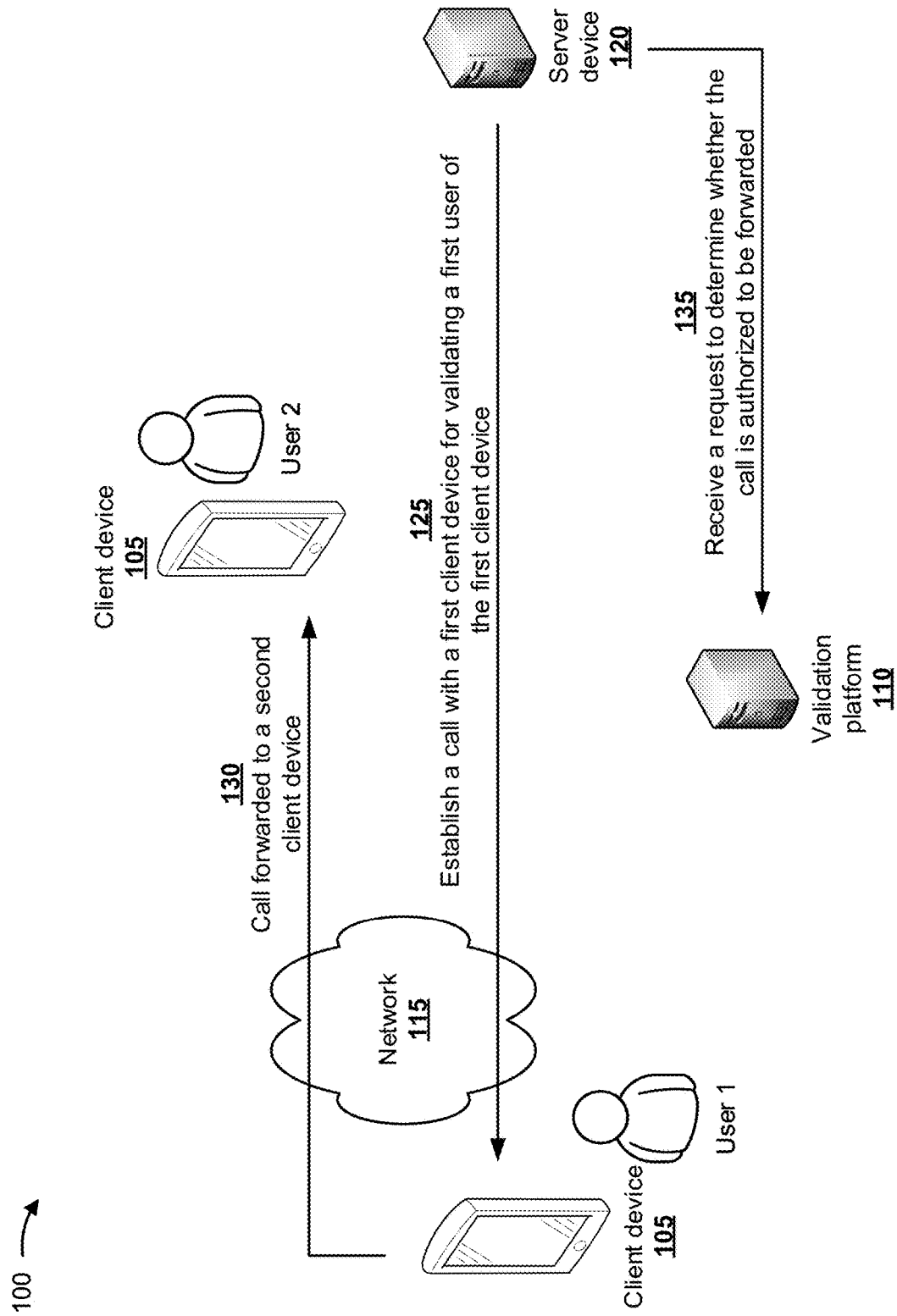

The following detailed description of example implementations refers to the accompanying drawings. The same reference numbers in different drawings may identify the same or similar elements.

Call forwarding may be used for legitimate purposes. For example, a call may be legitimately forwarded from one client device (e.g., a work telephone of a user) to another client device (e.g., a smartphone of the user) to enable the user to be available for the call. Call forwarding may also be used for illegitimate or fraudulent purposes. For example, a bad actor may steal account information associated with a user of a first client device (e.g., financial account information, client device information, and/or the like) and may cause the client device to forward calls to a second client device associated with the bad actor. The bad actor may utilize the account information and the call forwarding to misappropriate funds from a financial account of the user. A financial institution may place a call to the first client device and the first client device may forward the call to the second client device. The bad actor may answer the call and may utilize the account information to be authenticated by the financial institution and to receive the funds from the financial account.

The user and/or the financial institution may investigate to determine that the funds have been misappropriated. The financial institution may take steps to identify the misappropriation, credit the user's financial account, issue new account credentials, and/or the like. The user may take steps to receive new account credentials with the financial institution, new credentials with a telecommunications provider, and/or the like. The investigation of the theft, and taking such steps, waste computing resources (e.g., processing resources, memory resources, communication resources, and/or the like), networking resources, and/or the like associated with the user, the financial institution, and the telecommunications provider.

Some implementations described herein provide a validation platform that utilizes machine learning to detect and determine whether call forwarding is authorized (e.g., whether the call is allowed or permitted to be received by a user when the call is forwarded for any reason). For example, the validation platform may receive, from a server device, a request to determine whether a call is authorized to be forwarded. The call may be intended to be established between the server device and a first client device via a network, and the call may be established between the server device and a second client device via the network after the call is forwarded from the first client device to the second client device via the network. The validation platform may receive, from the network and based on the request, network data associated with the call, and account data associated with a first user of the first client device, and may determine that the call is forwarded based on the network data. The validation platform may process the account data and information indicating that the call is forwarded, with a machine learning model, to determine a score indicating whether the call is authorized to be forwarded, and may provide, to the server device, the score indicating whether the call is authorized to be forwarded to cause the server device to perform one or more actions based on the score.

In this way, the validation platform prevents validating a bad actor via call forwarding, which prevents theft by the bad actor and conserves computing resources (e.g., processing resources, memory resources, communication resources, and/or the like), networking resources, and/or the like that would otherwise be wasted in investigating the theft, identifying the theft, updating the user credentials with financial institutions and/or telecommunications providers, and/or the like.

FIGS. 1A-1G are diagrams of one or more example implementations 100 described herein. As shown in FIG. 1A, a first client device 105 may be associated with a first user (e.g., user 1) and a server device 120, via a network 115. A second user (e.g., user 2) may be associated with a second client device 105 to which calls to first client device 105 are forwarded. In some implementations, the second user may be a bad actor that stole account information associated with the first user (e.g., financial account information, information associated with first client device 105, and/or the like) and may cause first client device 105 to forward calls to second client device 105 via network 115. In some implementations, second client device 105 may be associated with the first user and the first user may legitimately cause first client device 105 to forward calls to second client device 105. For example, a call may be legitimately forwarded from first client device 105 (e.g., a work telephone of the first user) to second client device 105 (e.g., a smartphone of the first user) to enable the first user to be available for the call.

Server device 120 may be associated with a financial account that cannot be accessed without authorization of the first user, a resource that cannot be accessed without authorization of the first user, an online merchant, a social media service, and/or the like. A validation platform 110 may be provided to determine whether a call is authorized to be forwarded from first client device 105 and to aid server device 120 in determining whether the first user provides authorization to access the financial account, the resource, the online merchant, the social media service, and/or the like.

In some implementations, validation platform 110 may be associated with a telecommunication service provider (e.g., and can determine information associated with the call) and server device 120 may be associated with a vendor (e.g., a financial institution, an online merchant, a social media service provider, the telecommunication service provider, and/or the like). Thus, validation platform 110 may be provided by an entity that is independent of an entity that operates server device 120 and validation platform 110 may operate to provide a service (e.g., indicating whether call forwarding is authorized) to a plurality of entities that are all independent of the entity operating validation platform 110 and that may all be independent of each other.

As further shown in FIG. 1A, and by reference number 125, server device 120 may establish a call (e.g., a voice over Long Term Evolution (VoLTE) call) with first client device 105 for validating the first user of first client device 105. For example, server device 120 may be associated with a financial institution and may call the first user in order to receive authorization of the first user to perform a financial transaction (e.g., withdraw funds) associated with a financial account of the first user. The call may be forwarded from first client device 105 to second client device 105, as indicated by reference number 130 in FIG. 1A and based on the second user setting up call forwarding for first client device 105.

As further shown in FIG. 1A, and by reference number 135, validation platform 110 may receive, from server device 120, a request to determine whether the call is authorized to be forwarded from first client device 105 to second client device 105. In some implementations, validation platform 110 may receive the request when the call is established between server device 120 and first client device 105 (e.g., concurrently with establishment of the call). In some implementations, validation platform 110 may receive the request after the call is established between server device 120 and first client device 105 (e.g., after the call is established and before the call is forwarded by first client device 105). In some implementations, validation platform 110 may receive the request before the call is established between server device 120 and first client device 105 (e.g., after the call is initiated and before establishment of the call).

Figure 1B:
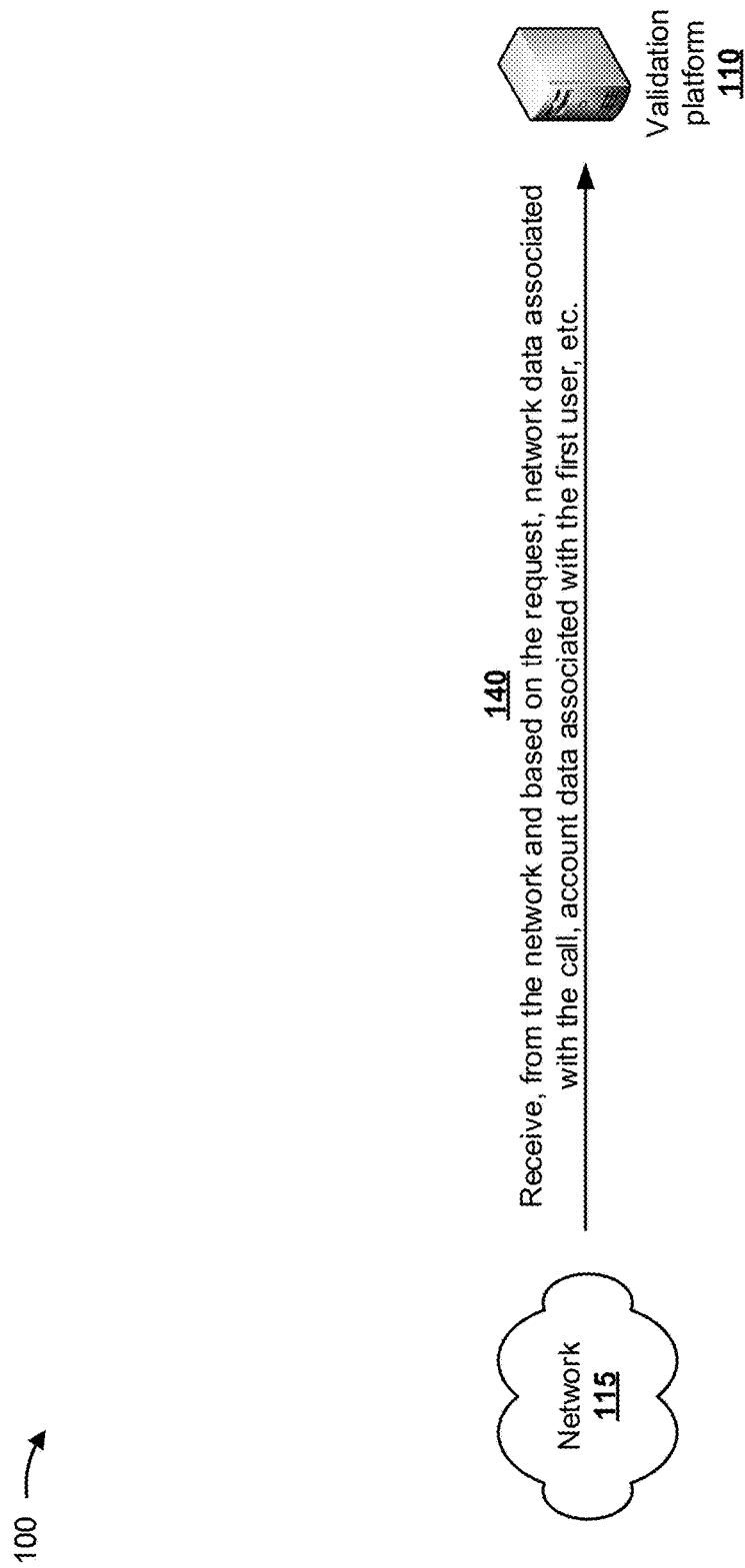

As shown in FIG. 1B, and by reference number 140, validation platform 110 may receive, from network 115 and based on the request, network data associated with the call, account data associated with the first user, and/or the like. In some implementations, the network data may include data identifying provisioning data associated with the call and received from one or more provisioning systems of network 115, signaling data associated with the call and received from one or more signaling systems of network 115, and/or the like. In some implementations, the account data associated with the first user may include a name of the first user, a network address of first client device 105, a geographic address of the first user, an identification associated with the first user, an account identification associated with the first user, telecommunications preferences associated with the first user (e.g., a preference associated with call forwarding for first client device 105, a preference identifying a telephone number of second client device 105, and/or the like), and/or the like.

Figure 1C:
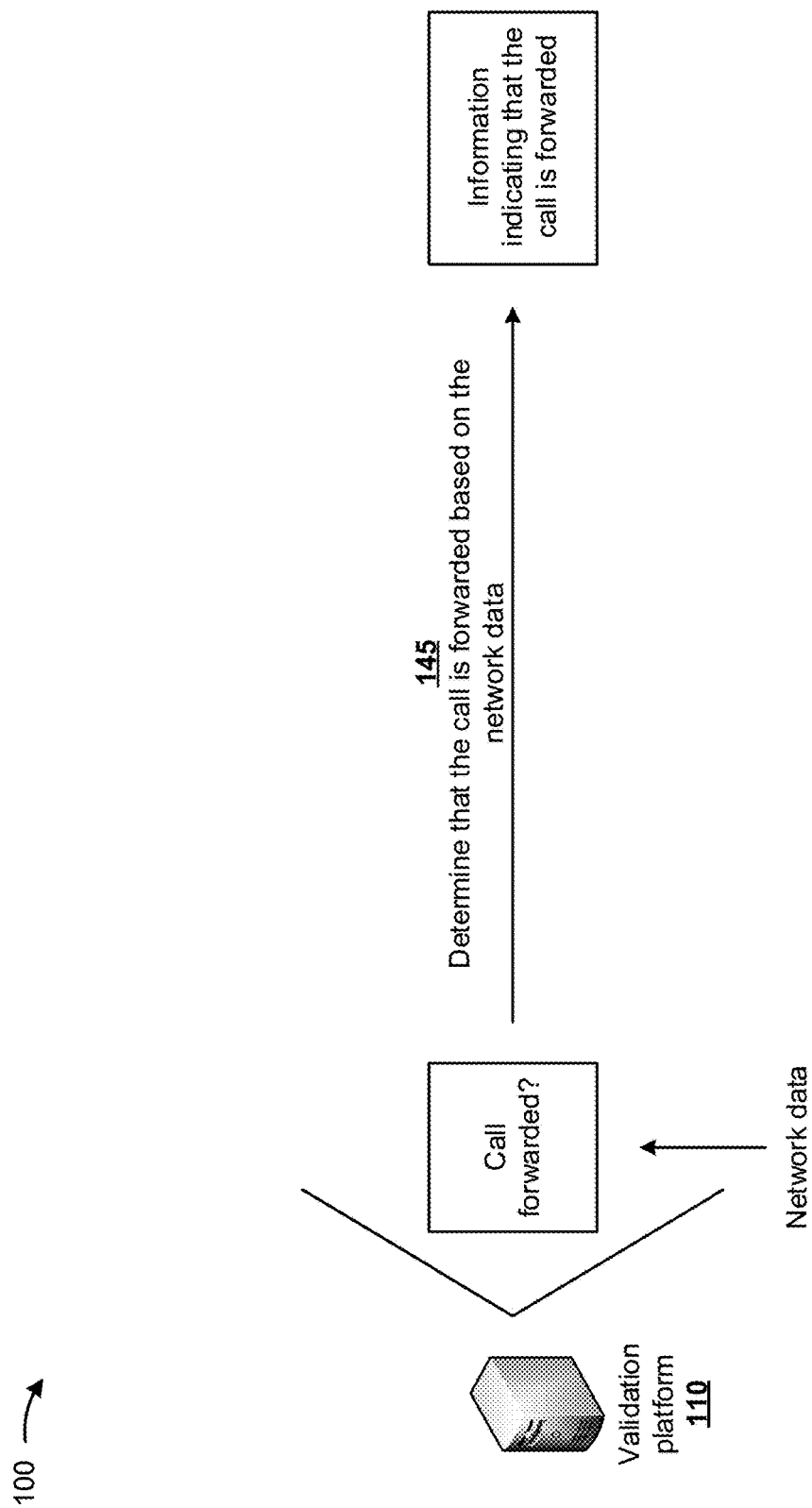

As shown in FIG. 1C, and by reference number 145, validation platform 110 may determine that the call is forwarded based on the network data. In some implementations, validation platform 110 may determine that the call is forwarded, forked, a multi-ring call, and/or the like, based on the network data. In some implementations, validation platform 110 may utilize provisioning data from one or more provisioning systems of network 115 to determine that the call is forwarded, may utilize signaling data from one or more signaling systems of network 115 to determine that the call is forwarded, may utilize data from a call verification system of network 115 to determine that the call is forwarded, and/or the like.

Figure 1D:
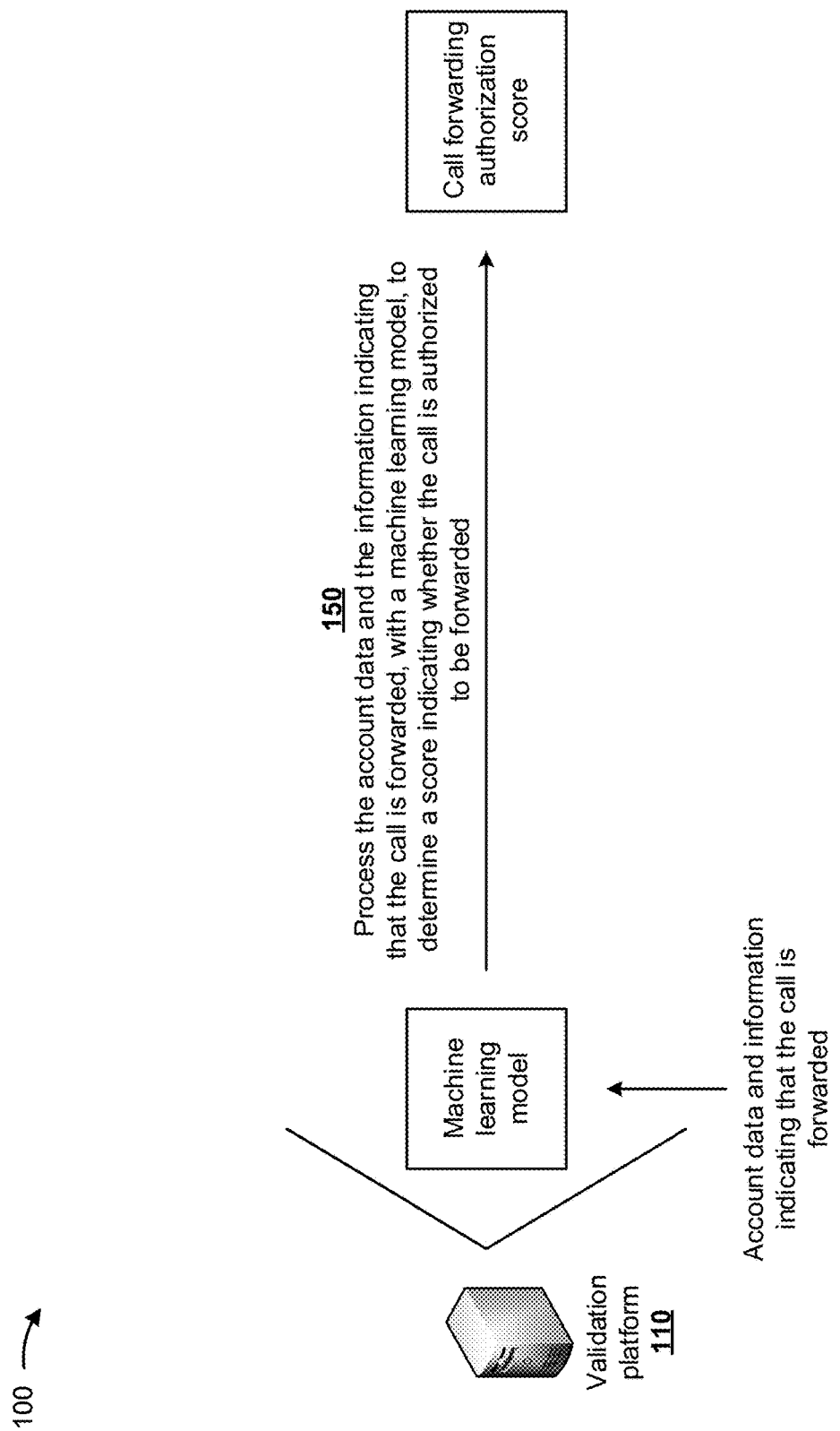

As shown in FIG. 1D, and by reference number 150, validation platform 110 may process the account data and the information indicating that the call is forwarded, with a machine learning model, to determine a score indicating whether the call is authorized to be forwarded. In some implementations, the machine learning model may be trained (e.g., by validation platform 110 or another device) to determine a score indicating whether the call is authorized to be forwarded. A higher score may indicate that the call forwarding is more likely to be legitimate and, thus authorized, and a lower score may indicate that the call forwarding is more likely to be illegitimate and, thus unauthorized.

In some implementations, validation platform 110 may train the machine learning model with historical data identifying account data, data indicating that prior calls are forwarded or not forwarded, data indicating known mobile directory numbers (MDNs) or telephone numbers associated with scams, times of day associated with the prior calls, geographical locations associated with the prior calls, and scores indicating that the prior calls are authorized or not authorized to be forwarded. For example, validation platform 110 may separate the historical data into a training set, a validation set, a test set, and/or the like. The training set may be utilized to train the machine learning model. The validation set may be utilized to validate results of the trained machine learning model. The test set may be utilized to test operation of the machine learning model.

In some implementations, validation platform 110 may train the machine learning model using, for example, an unsupervised training procedure and based on the historical data. For example, validation platform 110 may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, validation platform 110 may use a logistic regression classification technique to determine a categorical outcome (e.g., that particular historical data indicates that a prior call is authorized to be forwarded). Additionally, or alternatively, validation platform 110 may use a naïve Bayesian classifier technique. In this case, validation platform 110 may perform binary recursive partitioning to split the historical account data and information indicating whether prior calls are forwarded into partitions and/or branches and use the partitions and/or branches to determine outcomes (e.g., that particular historical data indicates that a prior call is authorized to be forwarded). Based on using recursive partitioning, validation platform 110 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, validation platform 110 may use a support vector machine (SVM) classifier technique to generate a non-linear boundary between data points in the training set. In this case, the non-linear boundary is used to classify test data into a particular class.

Additionally, or alternatively, validation platform 110 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, validation platform 110 may use one or more other model training techniques, such as a neural network technique, a latent semantic indexing technique, and/or the like. For example, validation platform 110 may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by validation platform 110 by being more robust to noisy, imprecise, or incomplete data, and by enabling validation platform 110 to detect patterns and/or trends undetectable to human analysts or systems using less complex techniques.

In some implementations, when processing the account data and the information indicating that the call is forwarded with the machine learning model, validation platform 110 may assign weights to particular account data (e.g., account data identifying call forwarding settings for first client device 105, a time period when the call forwarding is authorized, a change to an account associated with the first user, and/or the like). For example, a first weight (e.g., indicating that call forwarding is authorized) may be assigned when the call forwarding settings indicate that the first user authorized call forwarding to second client device 105 after a threshold time period (e.g., in hours, days, weeks, and/or the like) from the time of the call, a second weight (e.g., less than the first weight and indicating that call forwarding is unauthorized) may be assigned when the call forwarding settings indicate that the first user authorized call forwarding to second client device 105 before the threshold time period from the time of the call, and/or the like. In another example, a first weight (e.g., indicating that call forwarding is authorized) may be assigned when the call forwarding settings indicate that the first user authorized call forwarding to second client device 105 at a particular time (e.g., during working hours, in the daytime, and/or the like), a second weight (e.g., less than the first weight and indicating that call forwarding is unauthorized) may be assigned when the call forwarding settings indicate that the first user authorized call forwarding to second client device 105 at another particular time (e.g., 2:00 AM, 3:00 AM, and/or the like), and/or the like.

In still another example, a first weight (e.g., indicating that call forwarding is authorized) may be assigned when a change to the account associated with the first user occurs after a threshold time period (e.g., in hours, days, weeks, and/or the like) from the time of the call, a second weight (e.g., less than the first weight and indicating that call forwarding is unauthorized) may be assigned when the change to the account associated with the first user occurs before a threshold time period from the time of the call, and/or the like.

In some implementations, validation platform 110 may assign additional weight to a call to a telephone number associated with the user's account, may automatically authorizing forwarding to the telephone number, and/or the like. In some implementations, validation platform 110 may assign weights to a type of diversion (e.g., a busy signal, an unconditional diversion, and/or the like), a quantity of diversions, and/or the like.

In some implementations, validation platform 110 may calculate multiple scores for the particular account data based on the weights. For example, validation platform 110 may assign a first score to the particular account data identifying the call forwarding settings for first client device 105 based on the weight assigned to the particular account data, may assign a second score to the particular account data identifying the time period when the call forwarding is authorized based on the weight assigned to the particular account data, may assign a third score to the particular account data identifying the change to the account associated with the first user based on the weight assigned to the particular account data, and/or the like.

For example, validation platform 110 may assign a higher first score to the particular account data identifying the call forwarding settings when the call forwarding settings indicate that call forwarding was authorized days, weeks, or months from the time of the call. In another example, validation platform 110 may assign a higher second score to the particular account data identifying the time period when the call forwarding is authorized when the call forwarding is authorized during working hours. In still another example, validation platform 110 may assign a higher third score to the particular account data identifying the change to the account associated with the first user, when the change to the account occurred days, weeks, or months from the time of the call.

In some implementations, validation platform 110 may determine the score indicating whether the call is authorized to be forwarded based on the multiple scores. For example, validation platform 110 may add the multiple scores together to generate the score indicating whether the call is authorized. A higher score may indicate that the call forwarding is more likely to be legitimate and, thus authorized, and a lower score may indicate that the call forwarding is more likely to be illegitimate and, thus unauthorized.

In some implementations, validation platform 110 may receive a trained machine learning model from another device. The other device may train the machine learning model to predict scores indicating whether prior calls are authorized to be forwarded, and may provide the trained machine learning model to validation platform 110.

As shown in FIG. 1E, and by reference number 155, validation platform 110 may provide, to server device 120, the score indicating whether the call is authorized to be forwarded. In some implementations, server device 120 may perform one or more actions based on the score indicating whether the call is authorized to be forwarded. For example, server device 120 may permit the call to continue with second client device 105, may provide, via the call, one or more questions (e.g., to ensure identification of the first user) to second client device 105, may terminate the call with first client device 105 and second client device 105, and/or the like. In some implementations, server device 120 may perform the one or more actions if the score satisfies a score threshold. For example, if the score satisfies a first score threshold, server device 120 may permit the call to continue with second client device 105; if the score satisfies a second score threshold, server device 120 may provide, via the call, the one or more questions to second client device 105; if the score satisfies a third score threshold, server device 120 may terminate the call with first client device 105 and second client device 105; and/or the like.

In some implementations, validation platform 110 may provide the score and a forwarding number associated with second client device 105 to server device 120. Service device 120 may utilize the score, the forwarding number, and user account information to determine whether permit the call to be forwarded.

In some implementations, validation platform 110 may perform the one or more actions or may cause the one or more actions to be performed by server device 120 based on the score. For example, validation platform 110 may terminate the call based on the score, may cause server device 120 to permit the call to continue with second client device 105, may cause server device 120 to provide, via the call, one or more questions (e.g., to ensure identification of the first user) to second client device 105, may cause server device 120 to terminate the call with first client device 105 and second client device 105, may cause server device 120 to provide a notification to the first user of the termination of the call via a secondary communication channel (e.g., email, a text message, and/or the like), and/or the like. In some implementations, validation platform 110 may cause the one or more actions to be performed if the score satisfies the score threshold, as described above.

As further shown in FIG. 1E, and by reference number 160, server device 120 may permit the call to continue with second client device 105 based on the score. For example, if the score satisfies the first score threshold, server device 120 may permit the call to continue with second client device 105. The call may continue with second client device 105, as indicated by reference number 165 in FIG. 1E. In this way, the entity associated with server device 120 may be reassured that call forwarding to second client device 105 is authorized and that the user associated with second client device 105 is the first user. The entity associated with server device 120 may then perform an action (e.g., conduct a financial transaction) with the user of second client device 105 without fear of fraudulent activity.

Figure 1F:
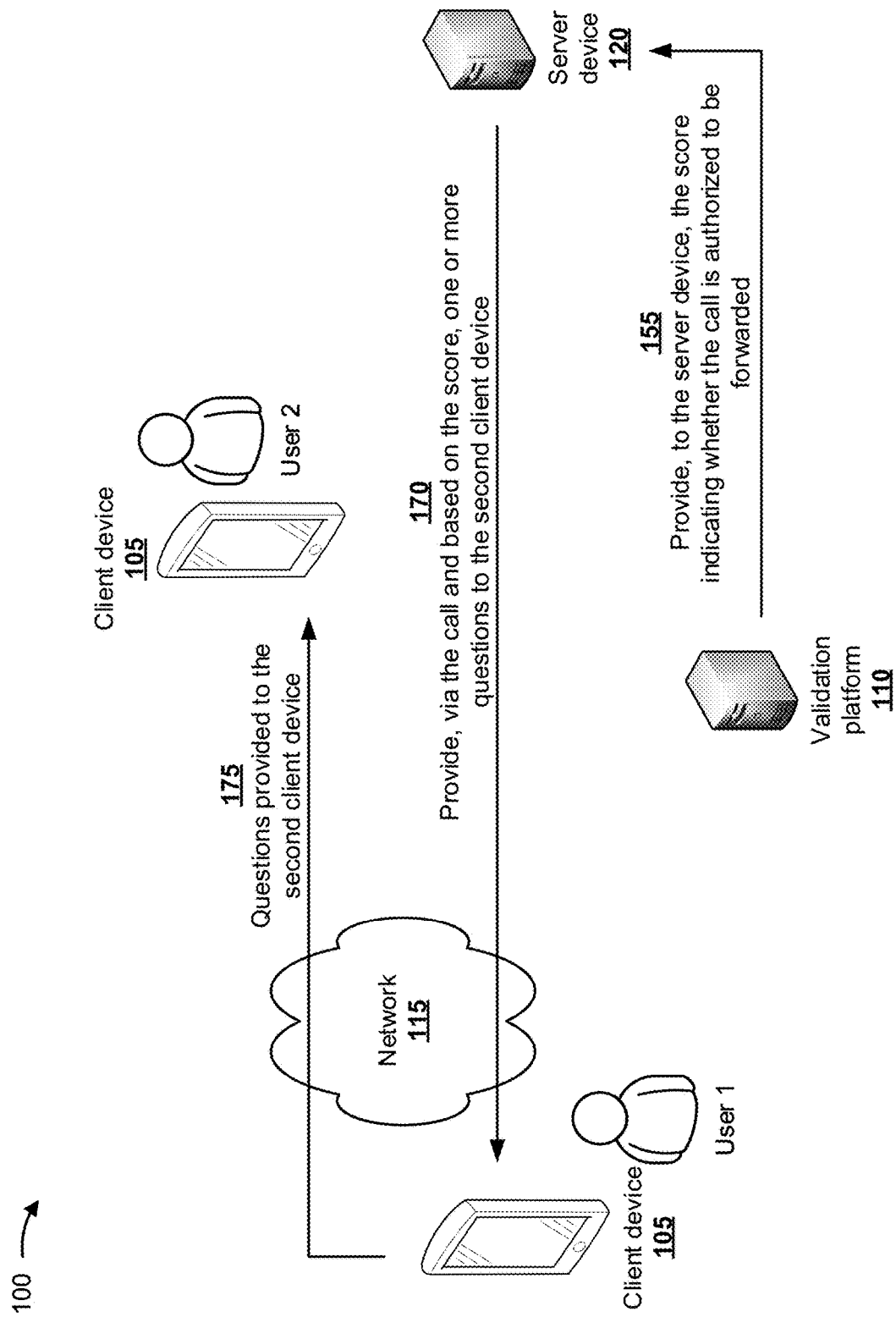

As shown in FIG. 1F, and by reference number 170, server device 120 may provide, via the call and based on the score, the one or more questions to second client device 105. For example, if the score satisfies the second score threshold, server device 120 may provide, via the call, the one or more questions to second client device 105. The one or more questions may be forwarded from first client device 105 to second client device 105, as indicated by reference number 175 in FIG. 1F. For example, server device 120 may provide one or more questions requesting additional information (e.g., a social security number, an account number, an identification number, and/or the like) from the user of second client device 105; requesting a secret known to the first user (e.g., a password, a personal identification number (PIN), and/or the like); requesting a physical characteristic of the first user (e.g., a biometric input); requesting a two-factor authentication; and/or the like.

As shown in FIG. 1G, and by reference number 180, server device 120 may terminate the call with first client device 105 and second client device 105. For example, if the score satisfies the third score threshold, server device 120 may terminate the call with first client device 105 and second client device 105. In this way, server device 120 may authorize or deny the second user of second client device 105, and may prevent fraudulent activity associated with call forwarding on first client device 105.

In this way, several different stages of the process for detecting and determining whether call forwarding is authorized are automated via machine learning, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning to detect and determine whether call forwarding is authorized. Finally, the process for utilizing machine learning to detect and determine whether call forwarding is authorized conserves computing resources (e.g., processing resources, memory resources, communication resources, and/or the like), networking resources, and/or the like that would otherwise be wasted in investigating theft, identifying the theft, updating user credentials with financial institutions and/or telecommunications providers, and/or the like.

As indicated above, FIGS. 1A-1G are provided merely as examples. Other examples may differ from what was described with regard to FIGS. 1A-1G. The number and arrangement of devices and networks shown in FIGS. 1A-1G are provided as an example. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of FIGS. 1A-1G may perform one or more functions described as being performed by another set of devices of FIGS. 1A-1G.

Figure 2:
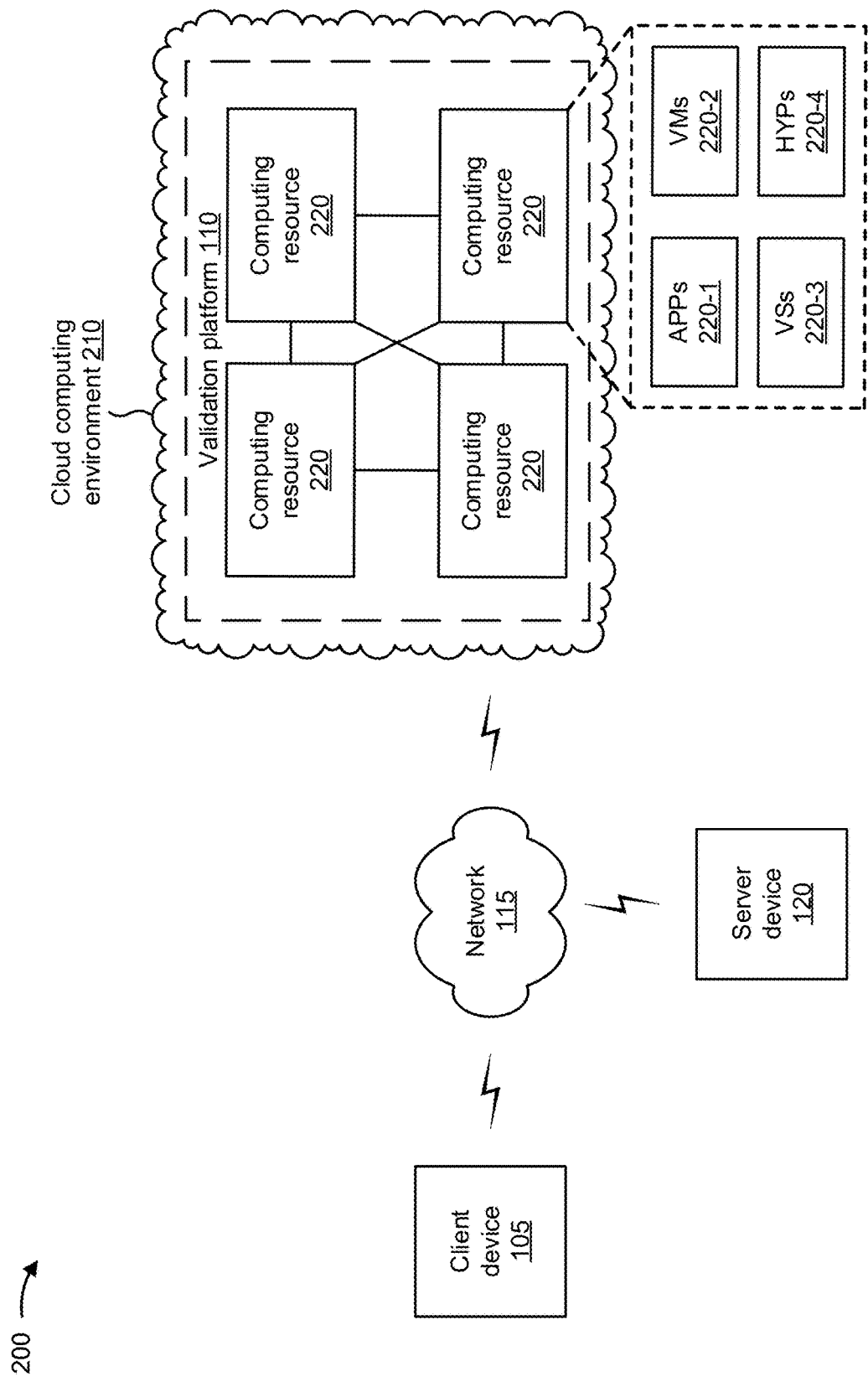
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, validation platform 110, network 115, and a server device 120. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 105 may receive information from and/or transmit information to validation platform 110 and/or server device 120.

Validation platform 110 includes one or more devices that utilize machine learning to detect and determine whether call forwarding is authorized. In some implementations, validation platform 110 may be designed to be modular such that certain software components may be swapped in or out depending on a particular need. As such, validation platform 110 may be easily and/or quickly reconfigured for different uses. In some implementations, validation platform 110 may receive information from and/or transmit information to one or more client devices 105 and/or server devices 120.

In some implementations, as shown, validation platform 110 may be hosted in a cloud computing environment 210. Notably, while implementations described herein describe validation platform 110 as being hosted in cloud computing environment 210, in some implementations, validation platform 110 may not be cloud-based (i.e., may be implemented outside of a cloud computing environment) or may be partially cloud-based.

Cloud computing environment 210 includes an environment that hosts validation platform 110. Cloud computing environment 210 may provide computation, software, data access, storage, etc., services that do not require end-user knowledge of a physical location and configuration of system(s) and/or device(s) that hosts validation platform 110. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host validation platform 110. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client device 105 and/or server device 120. Application 220-1 may eliminate a need to install and execute the software applications on client device 105 and/or server device 120. For example, application 220-1 may include software associated with validation platform 110 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of client device 105 and/or server device 120 or an operator of validation platform 110), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 115 includes one or more wired and/or wireless networks. For example, network 115 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 120 includes one or more devices capable of receiving, generating, storing, processing, and/or providing information, such as information described herein. For example, server device 120 may include a laptop computer, a tablet computer, a desktop computer, a group of server devices, or a similar type of device, associated with a merchant, a financial institution, and/or the like. In some implementations, server device 120 may receive information from and/or transmit information to client device 105 and/or validation platform 110.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 105, validation platform 110, server device 120, and/or computing resource 220. In some implementations, client device 105, validation platform 110, server device 120, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning to detect and determine whether call forwarding is authorized. In some implementations, one or more process blocks of FIG. 4 may be performed by a validation platform (e.g., validation platform 110). In some implementations, one or more process blocks of FIG. 4 may be performed by another device or a group of devices separate from or including the validation platform, such as a client device (e.g., client device 105) and/or a server device (e.g., server device 120).

As shown in FIG. 4, process 400 may include receiving, from a server device, a request to determine whether a call is authorized to be forwarded, wherein the call is intended to be established between the server device and a first client device via a network and wherein the call is established between the server device and a second client device via the network after the call is forwarded from the first client device to the second client device via the network (block 410). For example, the validation platform (e.g., using computing resource 220, processor 320, communication interface 370, and/or the like) may receive, from a server device, a request to determine whether a call is authorized to be forwarded, as described above in connection with FIGS. 1A-3. In some implementations, the call may be intended to be established between the server device and a first client device via a network. In some implementations, the call may be established between the server device and a second client device via the network after the call is forwarded from the first client device to the second client device via the network.

The request may be received when the call is established between the server device and the first client device, after the call is established between the server device and the first client device, before the call is established between the server device and the first client device, and/or the like. The call may include a voice over Long Term Evolution (VoLTE) call.

As further shown in FIG. 4, process 400 may include receiving, from the network and based on the request, network data associated with the call and account data associated with a first user of the first client device (block 420). For example, the validation platform (e.g., using computing resource 220, processor 320, communication interface 370, and/or the like) may receive, from the network and based on the request, network data associated with the call and account data associated with a first user of the first client device, as described above in connection with FIGS. 1A-3. The network data may include provisioning data associated with the call and received from a provisioning system of the network; signaling data associated with the call and received from a signaling system of the network; real time data via an application programming interface (API); data indicating whether the call may be forwarded, will be forwarded, is forwarded, and/or the like; and/or the like. The account data associated with the first user may include a name of the first user, a network address of the first client device, a geographic address of the first user, an identification associated with the first user, an account identification associated with the first user, and/or the like.

As further shown in FIG. 4, process 400 may include determining that the call is forwarded based on the network data (block 430). For example, the validation platform (e.g., using computing resource 220, processor 320, memory 330, and/or the like) may determine, by the device, that the call is forwarded based on the network data, as described above in connection with FIGS. 1A-3.

As further shown in FIG. 4, process 400 may include processing the account data and information indicating that the call is forwarded, with a machine learning model, to determine a score indicating whether the call is authorized to be forwarded (block 440). For example, the validation platform (e.g., using computing resource 220, processor 320, storage component 340, and/or the like) may process the account data and information indicating that the call is forwarded, with a machine learning model, to determine a score indicating whether the call is authorized to be forwarded, as described above in connection with FIGS. 1A-3.

The validation platform, when processing the account data and the information indicating that the call is forwarded with the machine learning model, may assign weights to particular account data identifying whether call forwarding is authorized for the first client device to the second client device, a time period when the call forwarding is authorized, and a change to an account associated with the first user; may calculate a plurality of scores for the particular account data based on the weights; and may determine the score indicating whether the call is authorized to be forwarded based on the plurality of scores.

The validation platform may train the machine learning model with training data associated with prior calls to enable the machine learning model to predict scores indicating whether the prior calls are authorized to be forwarded. The validation platform may receive the machine learning model from a device, where the machine learning model may be trained to predict scores indicating whether prior calls are authorized to be forwarded.

As further shown in FIG. 4, process 400 may include providing, to the server device, the score indicating whether the call is authorized to be forwarded to cause the server device to perform one or more actions based on the score (block 450). For example, the validation platform (e.g., using computing resource 220, processor 320, memory 330, storage component 340, communication interface 370, and/or the like) may provide, to the server device, the score indicating whether the call is authorized to be forwarded to cause the server device to perform one or more actions based on the score, as described above in connection with FIGS. 1A-3. The validation platform may cause the server device to perform the one or more actions based on the score. The validation platform may cause the server device to perform the one or more actions when the score indicating whether the call is authorized to be forwarded satisfies a threshold. The one or more actions may include the server device permitting the call to continue with the second client device; the server device providing, via the call, one or more questions to the second client device; the server device terminating the call with the first client device and the second client device; and/or the like.

Process 400 may include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A method, comprising:
receiving, by a device and from a server device, a request to determine whether a call is authorized to be forwarded,
wherein the call is intended to be established between the server device and a first client device via a network, and
wherein the call is established between the server device and a second client device via the network after the call is forwarded from the first client device to the second client device via the network;
receiving, by the device, from the network, and based on the request:
network data associated with the call, and
account data associated with a first user of the first client device;
determining, by the device, that the call is forwarded based on the network data;
processing, by the device, the account data and information indicating that the call is forwarded, with a machine learning model, to determine a score indicating whether the call is authorized to be forwarded,
wherein the call is authorized to be forwarded based on determining that the second client device is associated with a same user as the first client device; and
providing, by the device and to the server device, the score indicating whether the call is authorized to be forwarded to cause the server device to perform one or more actions based on the score.

2. The method of claim 1, wherein the request is received when the call is established between the server device and the first client device.

3. The method of claim 1, wherein the request is received after the call is established between the server device and the first client device.

4. The method of claim 1, wherein the request is received before the call is established between the server device and the first client device.

5. The method of claim 1, wherein the network data includes one or more of:
provisioning data associated with the call and received from a provisioning system of the network, or
signaling data associated with the call and received from a signaling system of the network.

6. The method of claim 1, wherein the account data associated with the first user includes one or more of:
a name of the first user,
a network address of the first client device,
a geographic address of the first user,
an identification associated with the first user, or
an account identification associated with the first user.

7. The method of claim 1, wherein the one or more actions comprise one or more of:
the server device permitting the call to continue with the second client device,
the server device providing, via the call, one or more questions to the second client device, or
the server device terminating the call with the first client device and the second client device.

8. A device, comprising:
one or more memories; and
one or more processors, communicatively coupled to the one or more memories, to:
receive, from a server device, a request to determine whether a call is authorized to be forwarded,
wherein the call is intended to be established between the server device and a first client device via a network, and
wherein the call is established between the server device and a second client device via the network after the call is forwarded from the first client device to the second client device via the network, and
wherein the request is received:
when the call is established between the server device and the first client device;
receive from the network, and based on the request:
network data associated with the call, and
account data associated with a first user of the first client device;
determine that the call is forwarded based on the network data;
process the account data and information indicating that the call is forwarded, with a machine learning model, to determine a score indicating whether the call is authorized to be forwarded,
wherein the call is authorized to be forwarded based on determining that the second client device is associated with a same user as the first client device; and
provide, to the server device, the score indicating whether the call is authorized to be forwarded.

9. The device of claim 8, wherein the one or more processors are further to:
cause the server device to perform one or more actions based on the score indicating whether the call is authorized to be forwarded.

10. The device of claim 9, wherein the one or more processors, when causing the server device to perform the one or more actions, are to one or more of:
cause the server device to permit the call to continue with the second client device;
cause the server device to provide, via the call, one or more questions to the second client device; or
cause the server device to terminate the call.

11. The device of claim 9, wherein the one or more processors, when causing the server device to perform the one or more actions, are to:
cause the server device to perform the one or more actions when the score indicating whether the call is authorized to be forwarded satisfies a threshold.

12. The device of claim 8, wherein the one or more processors, when processing the account data and the information indicating that the call is forwarded with the machine learning model, are to:
assign weights to particular account data identifying:
whether call forwarding is authorized for the first client device to the second client device,
a time period when the call forwarding is authorized, and
a change to an account associated with the first user;
calculate a plurality of scores for the particular account data based on the weights; and
determine the score indicating whether the call is authorized to be forwarded based on the plurality of scores.

13. The device of claim 8, wherein the one or more processors are further to:
train the machine learning model with training data associated with prior calls to enable the machine learning model to predict scores indicating whether the prior calls are authorized to be forwarded.

14. The device of claim 8, wherein the call is a voice over Long Term Evolution (VoLTE) call.

15. A non-transitory computer-readable medium storing instructions, the instructions comprising:
one or more instructions that, when executed by one or more processors, cause the one or more processors to:
receive, from a server device, a request to determine whether a call is authorized to be forwarded,
wherein the call is intended to be established between the server device and a first client device via a network, and
wherein the call is established between the server device and a second client device via the network after the call is forwarded from the first client device to the second client device via the network;
receive from the network, and based on the request:
network data associated with the call, and
account data associated with a first user of the first client device;
determine that the call is a forwarded call based on the network data;
process the account data and information indicating that the call is a forwarded call, with a machine learning model, to determine a score indicating whether the call is authorized to be forwarded,
wherein the call is authorized to be forwarded based on determining that the second client device is associated with a same user as the first client device; and
cause the server device to perform one or more actions based on the score indicating whether the call is authorized to be forwarded.

16. The non-transitory computer-readable medium of claim 15, wherein the request is received when the call is established between the server device and the first client device.

17. The non-transitory computer-readable medium of claim 15, wherein the one or more instructions, that cause the one or more processors to cause the server device to perform the one or more actions, cause the one or more processors to one or more of:
cause the server device to permit the call to continue with the second client device;
cause the server device to provide, via the call, one or more questions to the second client device; or
cause the server device to terminate the call.

18. The non-transitory computer-readable medium of claim 15, wherein the one or more instructions, that cause the one or more processors to cause the server device to perform the one or more actions, cause the one or more processors to:
cause the server device to perform the one or more actions when the score indicating whether the call is authorized to be forwarded satisfies a threshold.

19. The non-transitory computer-readable medium of claim 15, wherein the one or more instructions, that cause the one or more processors to process the account data and the information indicating that the call is forwarded with the machine learning model, cause the one or more processors to:
assign weights to particular account data identifying:
whether call forwarding is authorized for the first client device to the second client device,
a time period when the call forwarding is authorized, and
a change to an account associated with the first user;
calculate a plurality of scores for the particular account data based on the weights; and
determine the score indicating whether the call is authorized to be forwarded based on the plurality of scores.

20. The non-transitory computer-readable medium of claim 15, wherein the instructions further comprise:
one or more instructions that, when executed by the one or more processors, cause the one or more processors to:
receive the machine learning model from a device,
wherein the machine learning model is trained to predict scores indicating whether prior calls are authorized to be forwarded.

* * * * *